United States Patent
Wilkinson (10) Patent No.: US 8,113,807 B2
(45) Date of Patent: Feb. 14, 2012

(54) METHODS AND APPARATUS FOR FABRICATING STRUCTURES

(76) Inventor: Timothy Wilkinson, Portland, OR (US)

(*) Notice: Subject to any disclaimer, the term of this patent is extended or adjusted under 35 U.S.C. 154(b) by 651 days.

(21) Appl. No.: 11/844,975

(22) Filed: Aug. 24, 2007

(65) Prior Publication Data

US 2009/0051062 A1   Feb. 26, 2009

(51) Int. Cl.
    *B29C 47/12*   (2006.01)
(52) U.S. Cl. ........... 425/64; 425/375; 425/463; 425/465
(58) Field of Classification Search ............... 425/60, 425/64, 169, 207, 375, 461, 463, 465, 466
    See application file for complete search history.

(56) References Cited

U.S. PATENT DOCUMENTS

| | | | |
|---|---|---|---|
| 2,877,530 A | 3/1959 | Winn, Jr. | |
| 3,055,154 A | 9/1962 | Markley | |
| 3,206,899 A | 9/1965 | Wright | |
| 3,324,808 A | 6/1967 | Forth | |
| 3,365,855 A | 1/1968 | Vermette | |
| 3,412,426 A | 11/1968 | O'dell, Jr. | |
| 3,548,452 A * | 12/1970 | Caleb | 425/363 |
| 3,619,329 A * | 11/1971 | Wright | 156/500 |
| 3,696,179 A | 10/1972 | Jacobs | |
| 3,720,556 A | 3/1973 | Wright | |
| 3,897,298 A * | 7/1975 | Gray | 156/500 |
| 3,966,533 A * | 6/1976 | Goldsworthy et al. | 156/379.8 |
| 4,066,723 A * | 1/1978 | King et al. | 264/34 |
| 4,098,635 A | 7/1978 | Hay, II et al. | |
| 4,289,552 A | 9/1981 | Hammer | |
| 4,320,075 A | 3/1982 | Nielson | |
| 4,361,530 A * | 11/1982 | Peer | 264/120 |
| 4,372,733 A | 2/1983 | Tinning | |
| 4,573,300 A | 3/1986 | Bezner | |
| 4,734,021 A | 3/1988 | Maddock | |
| 4,787,775 A | 11/1988 | Hammer | |

(Continued)

FOREIGN PATENT DOCUMENTS

JP   61266220   11/1986

OTHER PUBLICATIONS

The International Bureau of WIPO; International Preliminary Report on Patentability for related application WO2009029121, dated Mar. 4, 2010.

(Continued)

*Primary Examiner* — Yogendra Gupta
*Assistant Examiner* — Emmanuel S Luk
(74) *Attorney, Agent, or Firm* — Kolisch Hartwell, P.C.

(57) ABSTRACT

Methods and apparatus for fabricating structures, extrusion units, and structures fabricated using such methods and apparatus are disclosed. The apparatus may include a support configured for rotation about a central axis, a carriage that may move along the support when the support rotates about the central axis such that the carriage may move along a first spiral path about the central axis, and an extrusion unit that may be supported by the carriage and may move along a second spiral path as the carriage moves along the first spiral path. The extrusion units may be configured to extrude a strip of material through an extrusion die as the extrusion unit moves along a previously extruded strip of material such that the extruded strip may be fused onto the previously extruded strip as the extruded and previously extruded strips pass the extrusion die.

12 Claims, 8 Drawing Sheets

U.S. PATENT DOCUMENTS

| | | | |
|---|---|---|---|
| 4,952,450 A | | 8/1990 | Noel |
| 5,247,958 A | | 9/1993 | Deparis |
| 5,305,564 A | | 4/1994 | Fahey |
| 5,348,790 A | | 9/1994 | Ben-Zvi et al. |
| 5,932,062 A | * | 8/1999 | Manser .................. 156/357 |
| 6,001,181 A | * | 12/1999 | Bullen .................. 118/679 |
| 6,103,161 A | * | 8/2000 | Lopez .................. 264/148 |
| 6,911,165 B2 | | 6/2005 | Sahala et al. |
| 7,153,454 B2 | * | 12/2006 | Khoshnevis .................. 264/34 |
| 7,213,379 B2 | | 5/2007 | Carlson et al. |
| 7,452,196 B2 | * | 11/2008 | Khoshnevis .................. 425/64 |
| 7,641,461 B2 | * | 1/2010 | Khoshnevis .................. 425/60 |
| 2007/0138678 A1 | * | 6/2007 | Khoshnevis .................. 264/34 |

OTHER PUBLICATIONS

Kautex Maschinenbau; Products webpage; http://www.kautex-group.com/userseite/dstart.asp?S=4&SN=7&GR=0&customer=Ka_1&language=e; printed May 10, 2007.

Polyflex, Inc.; "Fusion and Extrusion Welding" webpage; http://www.poly-flex.com/sbrffel.html; printed May 10, 2007.

Polyflex, Inc.; "Fillet Extrusion Seam Profile and T-Joint Detail" webpage; http://www.poly-flex.com/rffe2_2.html; printed May 10, 2007.

TWI; "Extrusion Welding of Plastics" webpage; http://www.twi.co.uk/j32k/protected/band_3/ksidf001.html; printed May 10, 2007.

Wikipedia; "Extrusion;" http://en.wikipedia.org/wiki/Extruding; printed May 23, 2007.

Wikipedia; "Plastics Extrusion;" http://en.wikipedia.org/wiki/Plastics_extrusion/ printed May 16, 2007.

Zhejiang Zhongcai Merchants Investment Group Co., Ltd.; "ASA/PVC Colorful Coextrusion Profiles" webpage; http://zhongcai.en.alibaba.com/product/50024006/50118651/PVC_Profiles_for_Window_Door/ASA...; printed May 10, 2007.

Valberg, "Extrusion Welding in Aluminum Extrusion," International Journal of Materials and Product Technology, vol. 17, No. 7, 2002, pp. 497-556.

International Search Report and Written Opinion for Application No. PCT/US2007/083811.

* cited by examiner

METHODS AND APPARATUS FOR FABRICATING STRUCTURES

FIELD OF THE DISCLOSURE

The present disclosure relates generally to methods and apparatus for fabricating structures and, more particularly, to methods and apparatus for fabricating structures from extruded strips of material.

BACKGROUND OF THE DISCLOSURE

Examples of methods and apparatus for fabricating structures, including from strips or panels of material, are disclosed in U.S. Pat. Nos. 6,911,165; 5,308,790; 5,305,564; 4,730,021; 4,573,300; 4,372,733; 4,361,530; 4,320,075; 4,098,635; 3,966,533; 3,720,556; 3,619,329; 3,548,452; 3,412,426; 3,365,855; 3,206,899; and 2,877,530. The disclosures of these and all other publications referenced herein are incorporated by reference in their entirety for all purposes.

SUMMARY

In some examples, structure fabricating apparatus may include a support, a carriage disposed on the support, and an extrusion unit supported by the carriage. The support may include a distal portion and a proximal portion. The support may be configured for rotation about a central axis. The distal portion of the support may be spaced from the central axis, and the proximal portion of the support may be disposed proximate the central axis. The carriage may be configured for motion along the support, such as between the distal portion and the proximal portion. The carriage may be configured to move along a first spiral path about the central axis, such as when the support rotates about the central axis. The extrusion unit may move along a second spiral path, such as when the carriage moves along the first spiral path. The extrusion unit may include an extrusion die, which may include an extrusion portion and a guide portion proximate the extrusion portion. The extrusion unit may extrude a currently extruded strip of material through the extrusion portion and along the second spiral path as the extrusion unit moves along the second spiral path. The guide portion of the extrusion die may pass along a previously extruded strip of material as the extrusion unit moves along the second spiral path. The currently extruded strip may be fused onto the previously extruded strip as the extrusion die passes the previously extruded strip.

In some examples, thermoplastic extrusion units may include a source of pressurized heat-softened thermoplastic material, an extrusion head, a drive mechanism, and a feed mechanism. The extrusion head may include an extrusion die, which may include a first opening that may include first and second portions. The first portion of the first opening may include a first open proximal end, a first open distal end, and first and second opposed sidewalls, which may extend from the first open proximal end toward the first open distal end. The second portion of the first opening may include a first proximal end wall, a second open distal end, and third and fourth opposed sidewalls, which may extend from the first proximal end wall toward the second open distal end. The first open proximal end may correspond to the second open distal end. The drive mechanism may be configured to advance the extrusion head along a first strip of material. The first strip of material may include a first fusion surface and first and second side surfaces extending from the first fusion surface. The first strip of material may at least partially pass through the first portion of the first opening as the extrusion head is advanced along the first strip of material with the first and second side surfaces proximate at least a portion of respective ones of the first and second opposed sidewalls and the first fusion surface proximate the first open proximal end of the first portion. The first fusion surface may provide a first distal end wall for the second portion of the first opening. The feed mechanism may be configured to extrude the thermoplastic material through the second portion such that a second strip of material is extruded through the second portion of the first opening as the extrusion head is advanced along the first strip of material. The third and fourth opposed sidewalls may form third and fourth side surfaces on the second strip of material. The second strip of material may be fused to the first fusion surface on the first strip of material. The first proximal end wall may form a first exposed surface on the second strip of material.

In some examples, methods of building a structure may include providing a source of pressurized heat-softened thermoplastic material, providing an extrusion head, extruding a first strip of thermoplastic material, passing at least a portion of the first strip of material, and extruding a second strip of thermoplastic material. The extrusion head may include an extrusion die having an opening, which may include first and second portions. Extruding the first strip of thermoplastic material may include extruding the first strip of thermoplastic material through the second portion of the opening. The second portion of the opening may include a proximal end wall and first and second opposed sidewalls. The proximal end wall may be configured to form a first fusion surface on the first strip of material. The first and second opposed sidewalls may be configured to form first and second side surfaces on the first strip of material. Passing at least a portion of the first strip of material may include passing at least a portion of the first strip of material through the first portion of the opening such that the first fusion surface of the first strip of material may provide a first distal end wall for the second portion of the opening. Extruding a second strip of thermoplastic material may include extruding a second strip of thermoplastic material through the second portion of the opening. The first and second opposed sidewalls may form third and fourth side surfaces on the second strip of material. The second strip of material may be fused to the first fusion surface on the first strip of material. The proximal end wall may form an exposed surface on the second strip of material.

DETAILED DESCRIPTION

Figure 1:
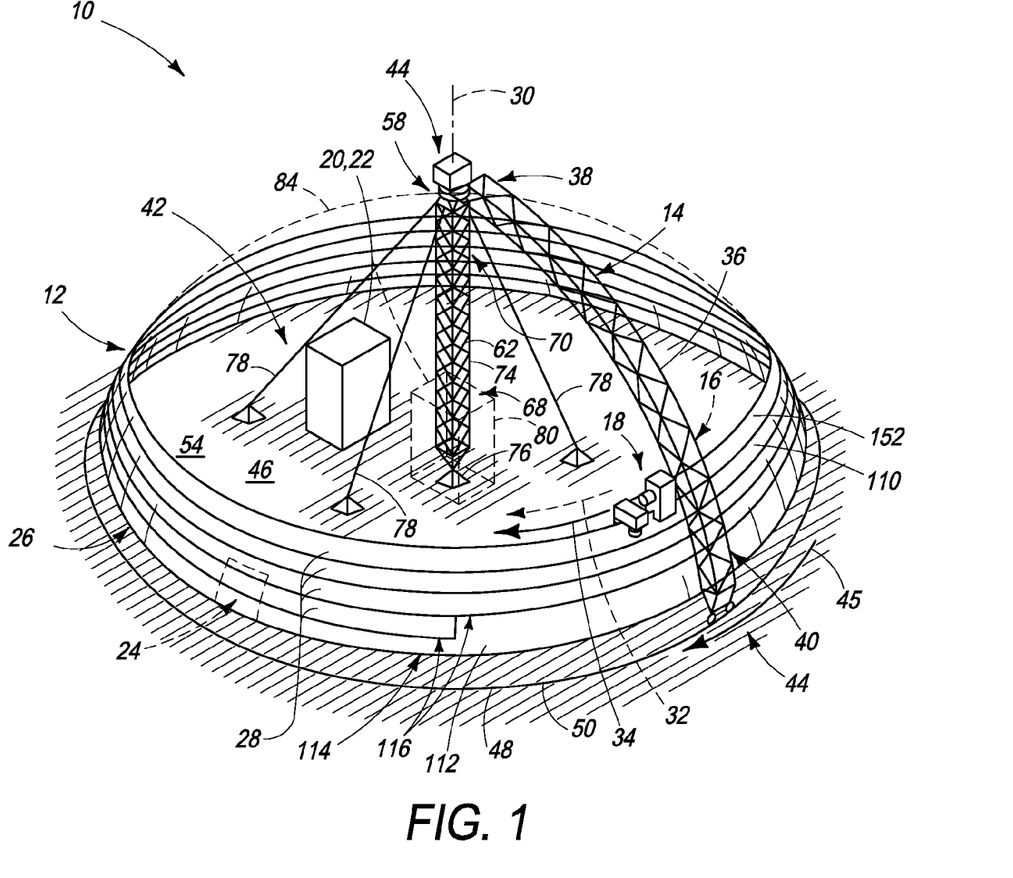
FIG. 1 is a perspective view of a nonexclusive illustrative example of a structure fabricating apparatus shown fabricating a nonexclusive illustrative example of a structure.
Figure 2:
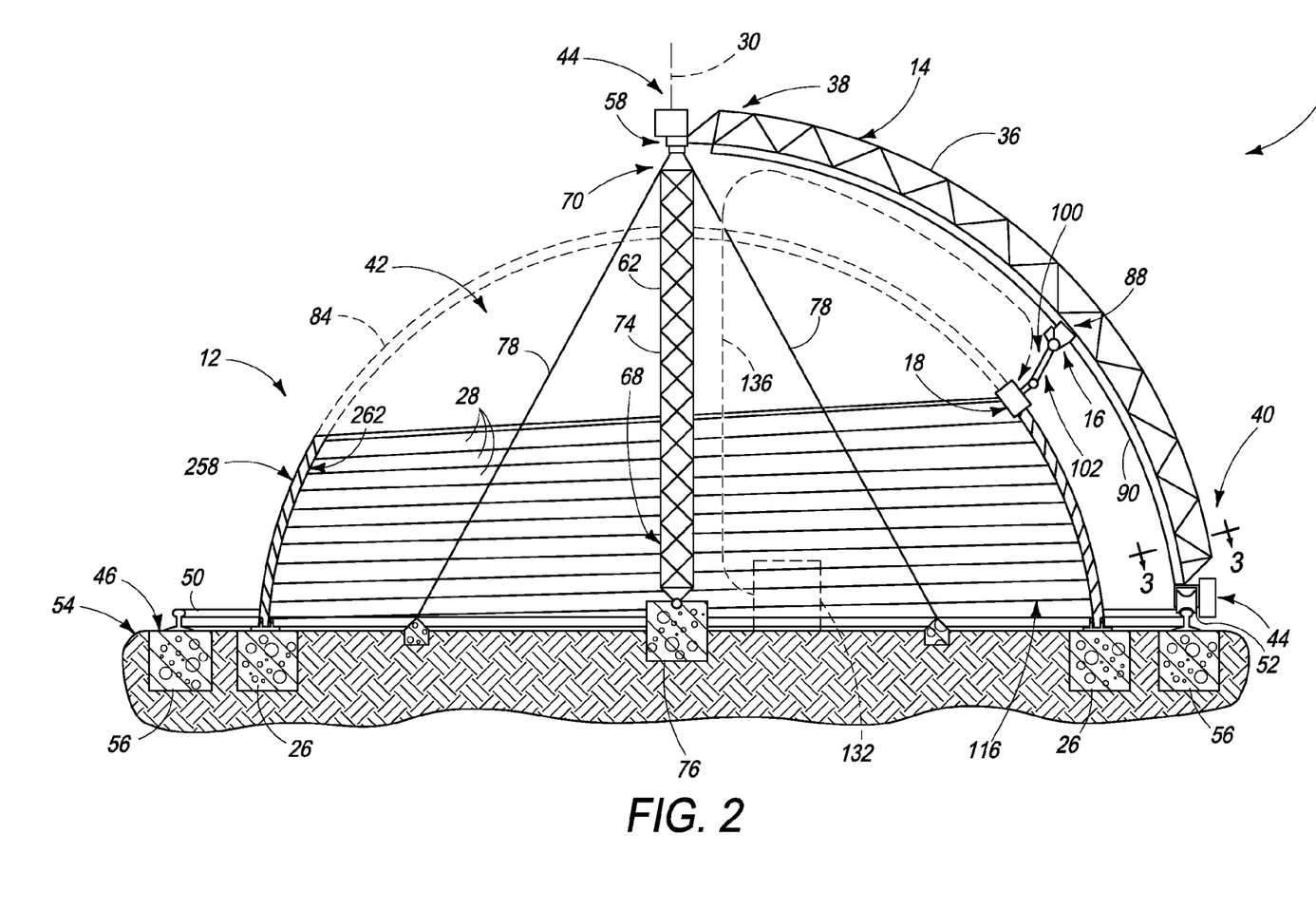
FIG. 2 is an elevation view showing the structure fabricating apparatus of FIG. 1 and a cross-sectional view of the structure of FIG. 1.

A nonexclusive illustrative example of a structure fabricating apparatus is shown generally at 10 in FIGS. 1 and 2. Unless otherwise specified, structure fabricating apparatus 10 may, but is not required to, contain at least one of the structures, components, functionality, and/or variations described, illustrated, and/or incorporated herein. In the nonexclusive illustrative example presented in FIGS. 1 and 2, the structure fabricating apparatus 10 is shown erecting or building a structure 12. As shown in the nonexclusive illustrative example presented in FIGS. 1 and 2, the structure fabricating apparatus 10 may include a support 14, a carriage 16 disposed on the support 14, and an extrusion unit 18 at least partially supported by the carriage 16.

In some nonexclusive illustrative examples, the structure 12 may be fabricated or erected to at least partially provide an environmental enclosure for one or more elements 20. For example, as shown in the nonexclusive illustrative example presented in FIG. 1, the structure 12 may be in the form of a dome that encloses one or more structures or buildings 22. Other examples of elements 20 that might be enclosed by the structure 12 may include vehicles or other equipment. Access to the interior of the dome may be provided by a suitably sized opening 24 in the structure 12, which may be created after the structure 12 has been fabricated, or a tunnel that passes beneath a foundation 26 of the structure 12.

As will be more fully discussed below and as shown in the nonexclusive illustrative example presented in FIGS. 1 and 2, structure 12 may be in the form of a strip 28 of a suitable material, such as a heat-softenable thermoplastic, that is extruded by the extrusion unit 18 in a spiral path about a central axis 30. More particularly, the carriage 16 may move in or along a first spiral path 32 about the central axis 30, and the extrusion unit 18, which may be at least partially supported by the carriage 16, may extrude the strip 28 of material along a second spiral path 34 about the central axis 30 as the extrusion unit 18 moves along the second spiral path 34 and the carriage moves along the first spiral path 32. By "spiral," it is meant either the path of a point along a surface of revolution where the point concurrently revolves around the axis of the surface of revolution and moves in a single direction along the axis of the surface of revolution, such as a helix, or the path of a point in a plane moving around a central point while continuously receding from or approaching the central point.

The support 14 may include any suitable structure that may be configured for rotation about the central axis 30. For example, as shown in FIGS. 1 and 2, the support 14 may be in the form of a truss or truss-like structure, such as a metal lattice or space frame 36, that extends between a proximal portion 38 of the support 14 and a distal portion 40 of the support 14. Depending on the size and shape of the support 14, other suitable structures may include frames and/or beams, any of which may be self-supporting and/or at least partially externally supported. As shown in the example presented in FIGS. 1 and 2, the proximal portion 38 of the support 14 may be disposed proximate the central axis 30, and the distal portion 40 of the support 14 may be spaced from the central axis 30.

As shown in FIGS. 1 and 2, at least a portion of the support 14 may be located external to the structure 12 with the extrusion unit 18 supported between at least a portion of the support and the central axis 30. Locating at least a portion of the support 14 external to the structure 12 may reduce, minimize or even, in some examples, eliminate those portions of the structure fabricating apparatus 10 that might otherwise sweep through the interior 42 of the structure 12. Reducing or eliminating portions of the structure fabricating apparatus 10 that sweep through the interior 42 of the structure 12 may permit erection and/or installation of the elements 20 within the interior 42 of the structure 12 prior to enclosure of the elements 20 during fabrication of the structure 12. For example, buildings 22 that are to be enclosed by the structure 12 may be built prior to fabrication of the structure 12, which may enhance construction access to the buildings 22 and/or may reduce or even preclude the need to remove from the interior 42 debris from the construction of the buildings 22.

In some nonexclusive illustrative examples, the structure fabricating apparatus 10 may include at least one support drive unit as shown schematically in FIGS. 1-5 and indicated generally at 44. The at least one support drive unit 44 may be configured to rotate the support 14 about the central axis 30 as indicated by the arrow 45 in FIG. 1. The support drive unit 44 may include any suitable source of motive power, such as electric motors or internal combustion engines.

In some nonexclusive illustrative examples, the structure fabricating apparatus 10 may include a support drive unit 44 that is disposed proximate the distal portion 40 of the support 14. For example, as shown schematically in FIGS. 1 and 2, the central axis 30 may be transverse to a base surface 46, with the support drive unit 44, being configured to move the distal portion 40 of the support 14 along a closed-loop path 48 on the base surface 46. By "transverse," it is meant that the indicated members are obliquely or perpendicularly oriented.

Figure 3:
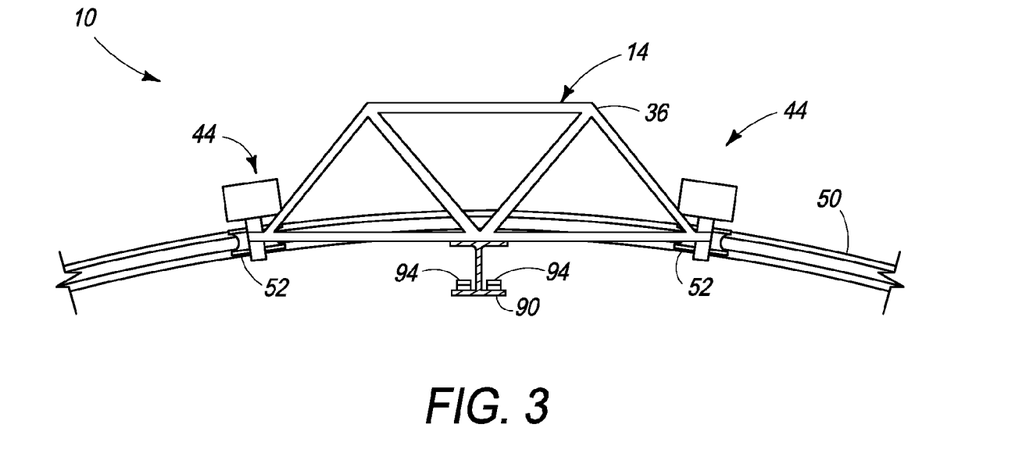
FIG. 3 is a cross-sectional view of a nonexclusive illustrative example of a support for the structure fabricating apparatus of FIG. 1, taken generally along line 3-3 in FIG. 2.
Figure 4:
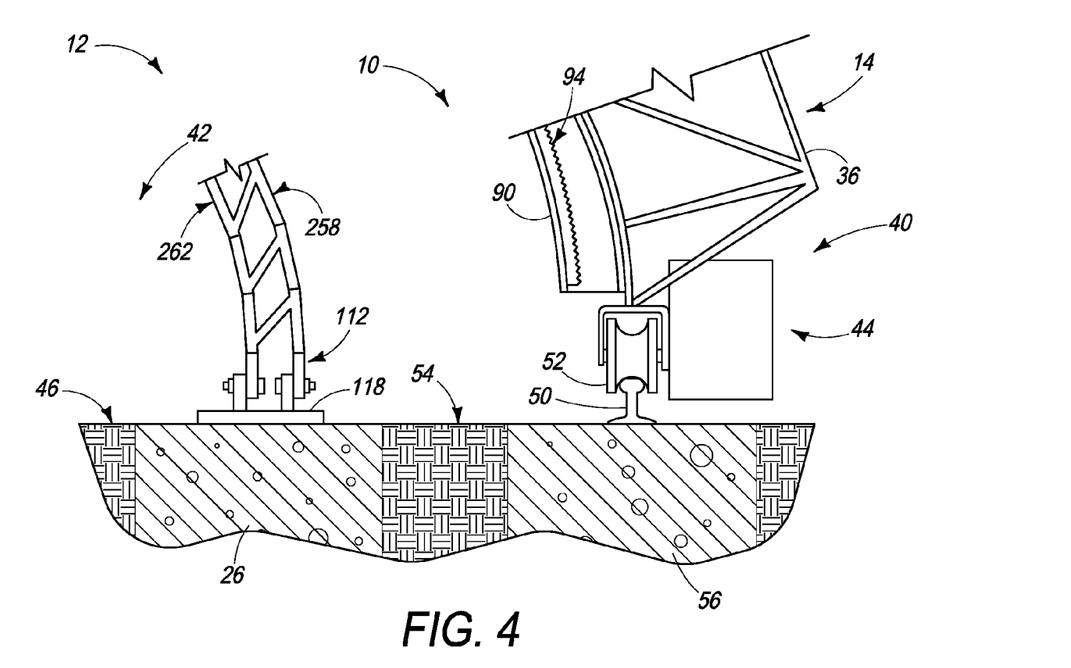
FIG. 4 is a detail view of the structure fabricating apparatus and structure of FIG. 1, showing nonexclusive illustrative examples of the base of the structure and the distal portion of the support.

The closed-loop path 48 may be any suitable pathway that may be configured to support the distal portion 40 of the support 14. For example, as shown in FIGS. 2-4, the closed-loop path 48 may include a rail 50 along which one or more wheels 52 secured to the distal portion 40 may travel. Although a plurality of wheels 52 may be provided on the distal portion 40, all, some or none of the wheels 52 may be powered, with any remaining ones of the wheels 52 being idler-wheels that may provide additional support and/or stability for the support 14. When the structure 12 is being fabricated on the ground 54, the rail 50 may be mounted on a suitable foundation 56, such as a concrete ring, that has been prepared or set into and/or on the ground, as shown in FIGS. 2 and 4.

Figure 5:
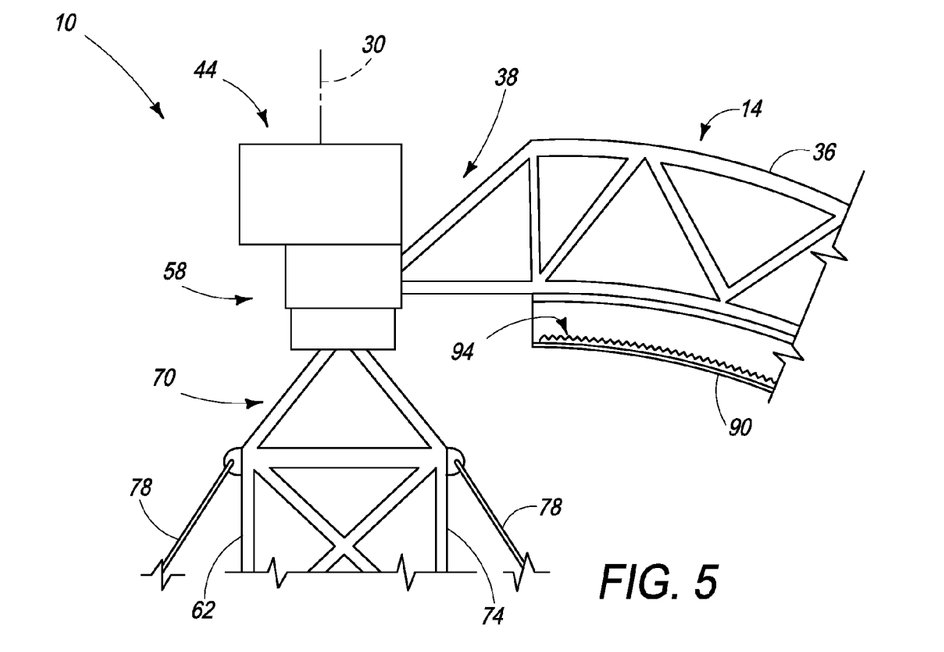
FIG. 5 is a detail view of the structure fabricating apparatus of FIG. 1, showing nonexclusive illustrative examples of the proximal portion of the support and the support portion of the tower.

In some nonexclusive illustrative examples, the support drive unit 44 may be disposed proximate the proximal portion 38 of the support 14. For example, as shown schematically in FIGS. 1 and 2, the proximal portion 38 of the support 14 may include a pivot assembly 58 disposed proximate the central axis 30. The pivot assembly 58 may include a support drive unit 44 in the form of any suitable source of motive power for rotational or pivoting motion, such as electric motors or internal combustion engines. As shown in FIGS. 1, 2 and 5, the proximal portion 38 of the support 14 may be rotationally or pivotably linked, such as via the pivot assembly 58, to a tower 62 that extends transversely from the base surface 46. Although the support 14 shown in FIGS. 1, 2 and 5 terminates at the pivot assembly 58, it should be understood that at least a portion of the support 14 may extend beyond or short of the pivot assembly 58. For example, in some nonexclusive illustrative examples, the support 14 may by at least partially symmetric relative to the central axis 30 and extend across or beyond the central axis 30, such as between opposed portions of the closed-loop path 48. Further, rather than being disposed on a tower as shown in FIGS. 1, 2 and 5, the pivot assembly 58 may be disposed proximate the base surface 46 or other suitable location. For example, the pivot assembly 58 may be disposed proximate the ground 54 or on an element 20 that is and/or will be enclosed by or external to the structure 12.

The tower 62 may include a base portion 68 and a support portion 70. As shown in the nonexclusive illustrative example presented in FIGS. 1 and 2, the base portion 68 may be disposed proximate the base surface 46, and the support portion 70 may be spaced from the base surface 46. The pivot assembly 58 of the support 14 may be pivotably engaged with the support portion 70 of the tower 62. A suitable configuration for the tower 62 may be selected based on such factors as the size and/or height of the tower 62 and/or the structure 12. For example, as shown in FIG. 1, the tower 62 may be in the form of a metal lattice mast 74 that is mounted on an appropriate foundation 76 supported by a plurality of stays or guys 78. Other suitable structures for the tower 62 may include guyed or self-supporting wood or concrete structures. As shown in FIGS. 1 and 2, the tower 62 may be aligned along the central axis 30 and/or be perpendicular to the base surface 46. In other examples, the tower 62 may be obliquely oriented to the base surface 46. For example, the tower 62 may be obliquely oriented when an obstruction on the base surface, such as a building 22 or natural obstruction, precludes positioning the base portion 68 on the central axis 30.

In some nonexclusive illustrative examples, at least a fixed portion 80 of the tower 62 may be configured to permanently remain within the structure 12. For example, a suitable building 22 that is to be enclosed by the structure 12 may provide a fixed portion 80 of the tower 62. When the tower 62 includes a fixed portion 80, the pivot assembly 58 may be disposed directly on the fixed portion 80 or the metal lattice mast 74, or other remaining portion of the tower, may be disposed on the fixed portion 80.

The support 14 may have any suitable shape when viewed in a plane containing the central axis 30 and the support 14. In some nonexclusive illustrative examples, the support 14 may be configured into a shape that is at least partially similar to at least a portion of a cross-sectional profile of the particular structure 12 that is being built by the structure fabricating apparatus 10. For example, when used to produce a generally dome-shaped structure, as shown in FIG. 2, the support 14 may have an arcuate shape when viewed in a plane containing the central axis 30 and the support 14. In some nonexclusive illustrative examples, the particular profile of the support 14, such as the arcuate shape shown in FIG. 2, may correspond to the cross-sectional profile 84 of the structure 12. However, in other examples, the support 14 may be shaped in a manner that is configured to at least partially assist locating the carriage 16 and/or the extrusion unit 18 in appropriate positions during use. For example, the profile of the support 14 may deviate from a theoretical profile that corresponds to the cross-sectional profile 84 of the structure 12, such as where the profile of the support has a different shape. As will become apparent from the explanations of the operating principles of the structure fabricating apparatus 10 that will be discussed below, the support may be variably deformed during use due to the varying loads to which the support 14 may be subjected as the carriage 16 moves along the support 14. Such deviations in the profile of the support 14 from the theoretical profile may be selected to offset the deformations induced by the varying loads such that at least a predetermined portion of the support 14 may be aligned with the theoretical profile. For example, the support 14 may be shaped such that the portion of the support 14 that is proximate the carriage 16 at a particular time is aligned with the theoretical profile. In such an example, the deformations induced by the varying loads may, at least in predetermined portions of the support 14, be used to provide a desired profile for the support 14.

Nonexclusive illustrative examples of structures 12 that may be built with structure fabricating apparatus 10 may include structures that are surfaces of revolution with respect to the central axis 30. In such examples, the closed-loop path 48 may be circular. For example, as shown in FIG. 1, the structure 12 may be a dome that has a circular footprint on the base surface. However, it is also within the scope of this disclosure that the structure fabricating apparatus 10 may be configured to fabricate structures having other than a circular footprint on the base surface 46. For example, the structure fabricating apparatus 10 may be configured to produce structures, such as ellipsoidal or other structures, that have an elliptical or otherwise noncircular footprint on the base surface 46. In such an example, the support 14 may be configured to provide a changeable or variable profile as it rotates about the central axis 30 such that the distal portion 40 tracks a non-circular closed-loop path. Furthermore, it is also within the scope of this disclosure that the structure fabricating apparatus 10 may be configured to fabricate structures that do not have a closed-loop footprint on the base surface 46. For example, the structure fabricating apparatus 10 may be configured to produce structures that have an open footprint on the base surface 46. Nonexclusive illustrative examples of structures having an open footprint may include structures with at least partially linear and/or curvilinear footprints. In addition to configuring the structure fabricating apparatus 10 to produce structures having an open footprint, it is further within the scope of this disclosure to use the extrusion unit 18 independently of the structure fabricating apparatus 10.

The carriage 16 may be configured to move along the first spiral path 32 about the central axis 30 when the support 14 rotates about the central axis 30. For example, the carriage 16 may be configured to move along the support 14 between the distal and proximal portions 38, 40 while the support 14 rotates about the central axis 30 such that the carriage 16 moves along the first spiral path 32.

Figure 6:
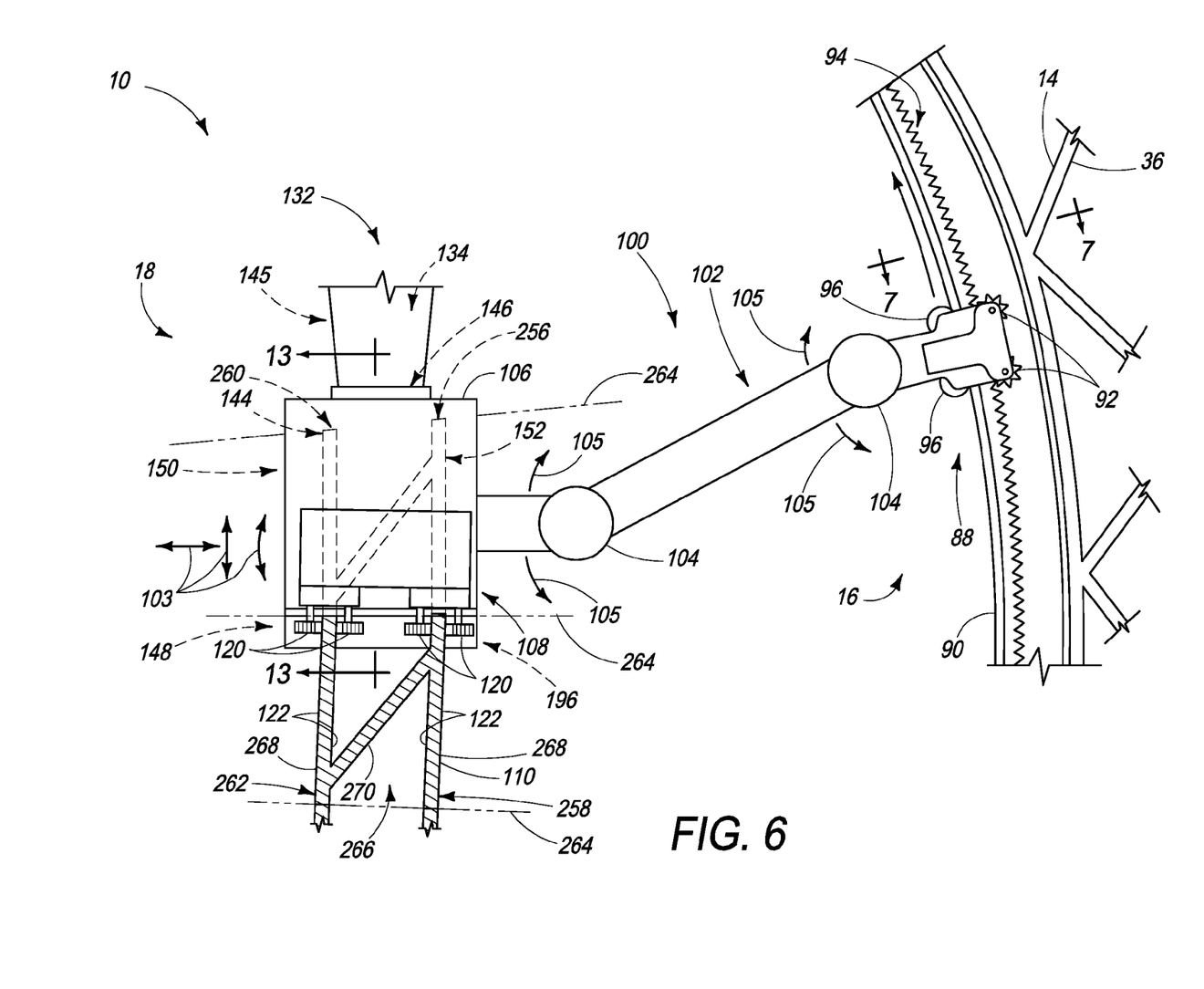
FIG. 6 is a detail view of the structure fabricating apparatus and structure of FIG. 1, showing a nonexclusive illustrative example of a carriage on the support, the front of a nonexclusive illustrative example of an extrusion unit including nonexclusive illustrative examples of an extrusion head, a drive mechanism, and an extrusion profile.
Figure 7:
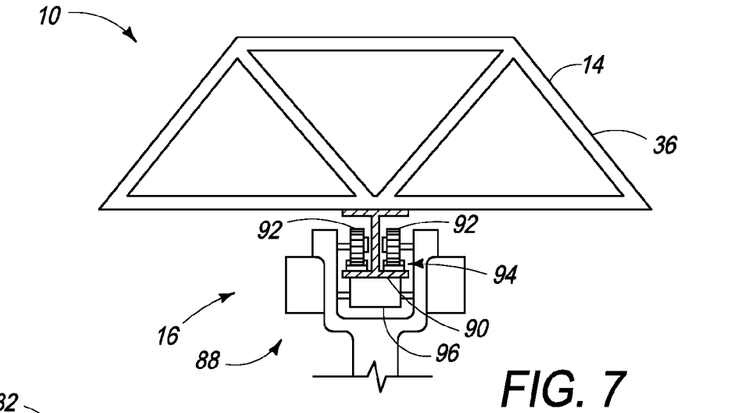
FIG. 7 is another cross-sectional view of the support of the structure fabricating apparatus of FIGS. 1 and 3, taken generally along line 7-7 in FIG. 6.

In some nonexclusive illustrative examples, the structure fabricating apparatus 10 may include an elevation drive unit as shown schematically in FIGS. 2, 6 and 7 and indicated generally at 88. The elevation drive unit 88 may be configured to move the carriage 16 along the support 14. For example, the elevation drive unit 88 may be configured to move the carriage 16 between the distal and proximal portions 38, 40 of the support 14. As shown in the nonexclusive illustrative example presented in FIGS. 6 and 7, the support 14 may include a suitable track 90 along which the carriage 16 may be configured to move. The elevation drive unit 88 may include one or more wheels, gears, cogs or pinions configured to engage the track 90. For example, as shown in FIGS. 6 and 7, the elevation drive unit 88 may include at least one powered gear 92 that is mounted on the carriage 16 and configured to engage a corresponding rack 94 disposed on the track 90. The elevation drive unit 88 may additionally include at least one opposing gear or wheel 96 that is mounted on the carriage 16 and configured to suitably engage the track 90, as shown in FIGS. 6 and 7. In some nonexclusive illustrative examples, the wheel or wheels 96 may also be powered.

The extrusion unit 18 may be connected to the carriage 16 by a support apparatus as shown schematically in FIGS. 2 and 6 and indicated generally at 100. The support apparatus 100 may be configured to at least partially support the extrusion unit 18 relative to the carriage 16. The support apparatus may include a powered or robotic arm 102 that may be configured to support and/or move the extrusion unit 18 relative to the carriage 16. For example, the robotic arm 102 may be configured to move and/or permit motion of the extrusion unit 18 relative to the carriage 16. The motion of the extrusion unit 18 relative to the carriage 16 may include translation along and/or rotation about one or more axes, such as is suggested by the arrows 103 in FIG. 6. As is understood in the art, translation along and/or rotation about one or more axes may include so-called five-axis or even six-axis control or motion. As shown schematically in FIGS. 2 and 6, the robotic arm 102 may include one or more joints 104. One of more of the joints 104 may be configured to permit rotation, as suggested by the arrows 105 in FIG. 6, about one or more axes such that the robotic arm 102 may provide and/or permit the desired range of rotational and/or translational support and/or motion.

In some nonexclusive illustrative examples, the support apparatus 100 may be configured to maintain the extrusion unit 18 in motion along the second spiral path 34 at least partially independently of the motion of the carriage 16. For example, the support apparatus 100 may be configured to at least partially maintain the extrusion unit 18 in motion along the second spiral path 34 while the carriage 16 moves along the first spiral path 32. The support apparatus 100 may additionally or alternatively be configured to at least partially maintain the extrusion unit 18 in motion along the second spiral path 34 when the carriage 16 deviates from the first spiral path 32. For example, as discussed above, the support 14 may be variably deformed during use such that the motion of the carriage 16 may deviate from the first spiral path 32. Such deformations may include deformations and/or deflections of the support 14 in a radial direction relative to the central axis 30. In such an example, the support apparatus 100, such as by suitable motion of the robotic arm 102, may maintain the extrusion unit 18 in motion along the second spiral path 34. Such suitable motion of the robotic arm 102 may include appropriate translation and/or rotation of one or more of the joints 104.

Figures 8, 9:
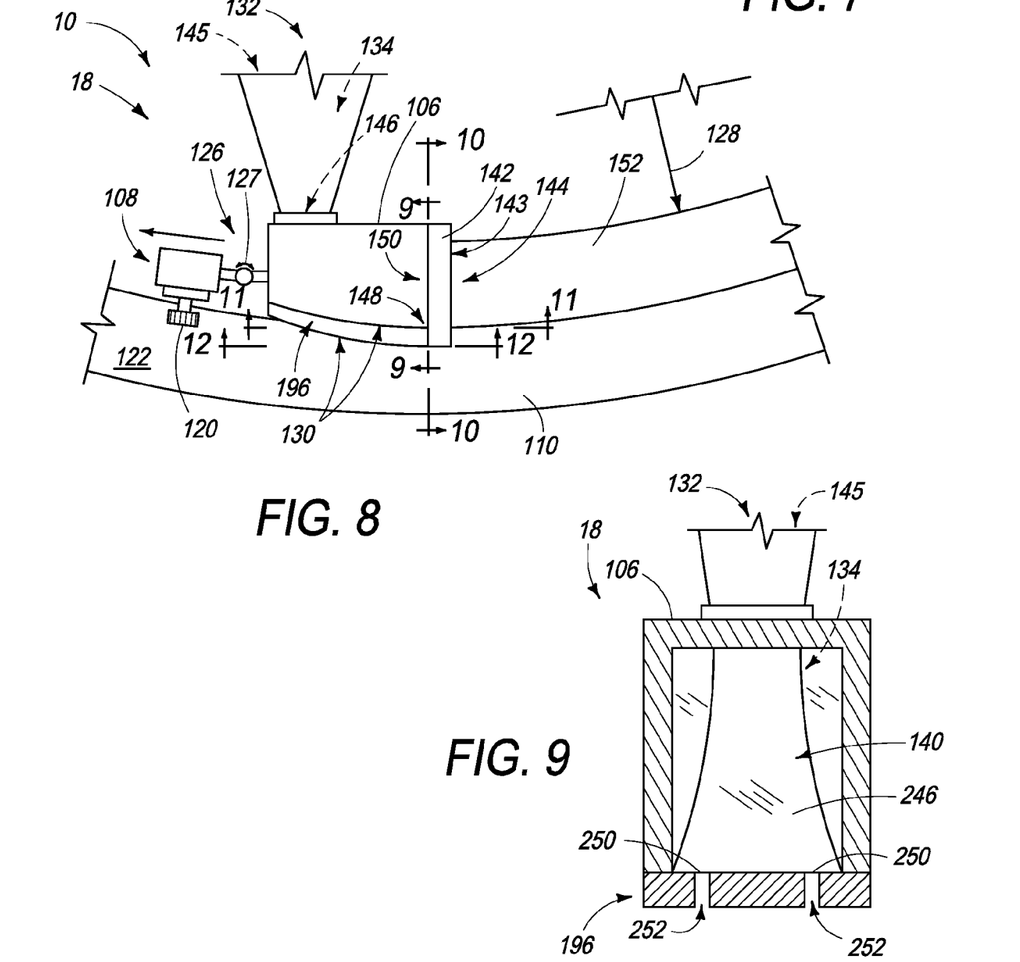
FIG. 8 is a side view of the extrusion unit of FIG. 6, showing the extrusion head and drive mechanism.
FIG. 9 is a cross-sectional view of the extrusion head of FIG. 6, taken generally along line 9-9 in FIG. 8.

The extrusion unit 18 may include an extrusion head 106 and, in some nonexclusive illustrative examples, an extrusion unit drive mechanism, which is shown schematically in FIGS. 6 and 8 and indicated generally at 108. The drive mechanism 108 may be configured to at least partially advance the extrusion unit 18 along the second spiral path 34. As shown in FIGS. 1, 6 and 8, drive mechanism 108 may include an engagement mechanism 120 so as to be configured to engage a first or preexisting strip 110 of material that is disposed along the second spiral path 34. For example, as shown in FIGS. 6 and 8, the drive mechanism 108 may include the engagement mechanism, such as at least one wheel 120 that may be configured to engage at least one of the opposed sides 122 of the preexisting strip 110 of material. The wheels 120 may be configured to at least partially move or guide the extrusion unit 18 along at least a portion of the second spiral path 34 and/or the preexisting strip 110 of material. For example, some of the wheels 120 may be driven such that the wheels 120 may move, or assist with motion of, the extrusion unit 18 along at least a portion of the second spiral path 34. Additionally or alternatively, some of the wheels may be adapted for free rotation such that the wheels 120 may guide, or assist with guidance of, the extrusion unit 18 along at least a portion of the second spiral path 34. As will be more fully discussed below, the preexisting strip 110 may have been previously extruded by the extrusion unit 18, as shown in FIGS. 1, 6 and 8. In some nonexclusive illustrative examples, the preexisting strip 110 may have been deposited by other than the extrusion unit 18. For example, the preexisting strip 110 may have been deposited by another extrusion unit or any other suitable source of material that may be adapted to continuously and/or intermittently deposit a strip of material along at least a portion of a spiral path.

The preexisting strip 110 may also or alternatively be in the form of a start ramp 112. As shown in the nonexclusive illustrative example presented in FIGS. 1, 2 and 4, the start ramp 112 may provide a transition path from the base surface 46 to the second spiral path 34. In particular, as may be seen in FIGS. 1 and 2, a lower profile 114 of the start ramp 112 may correspond to the base surface 46, which may or may not be planar, and an upper profile 116 of the start ramp 112 may correspond to the second spiral path 34. As used herein, the relative directions or orientations corresponding to "upper" and "lower" are based on the examples and drawings presented in the present disclosure. In particular, as used herein, the terms "upper" and "lower" should not be understood to require any particular orientation of a particular element in space, such as relative to the earth or the base surface 46.

The start ramp 112 may be secured to the foundation 26. For example, as shown in the nonexclusive illustrative example presented in FIGS. 2 and 4, the start ramp 112, which may be fabricated from a heat-softenable thermoplastic material, may be secured to one or more mounting plates 118 disposed on and/or secured to the foundation 26. The start ramp 112 may be secured to the mounting plate 118 using any suitable fastening method such as an adhesive or mechanical fasteners, such as bolts or rivets. In some nonexclusive illustrative examples, the mounting plate 118 may be integral with either or both of the start ramp 112 or the foundation 26.

The preexisting strip 110 may be of the same material as the strip 28 of material extruded by the extrusion unit 18, or it may be of a different material. For example, when the preexisting strip 110 is of the same material as the strip 28 of material extruded by the extrusion unit 18, it may have previously been extruded by the extrusion unit 18 or another extrusion unit, which may be operating concurrently with the extrusion unit 18, or it may be a portion of the start ramp 112, such as at least the portion of the start ramp 112 that is proximate the upper profile 116. When the preexisting strip 110 is of a material that is different than the strip 28 of material extruded by the extrusion unit 18, it may be a material to which the strip 28 may readily bond.

The drive mechanism 108 may be connected to the extrusion head 106 via a flexible connection or connection link as shown schematically in FIG. 8 and indicated generally at 126. The flexible connection 126 may be configured to selectively maintain the drive mechanism 108 in at least one position or angular orientation relative to the extrusion head 106. For example, the flexible connection 126 may permit rotation of the drive mechanism 108 relative to the extrusion head 106 about one or more axes, as suggested by arrow 127 in FIG. 8, such that the drive mechanism 108 may be variably positioned relative to the extrusion head 106. Such flexibility and variable positioning may be used to account for variations in the curvature of the second spiral path 34 and the extruded strip 28 of material that may occur during the fabrication of the structure 12. For example, in addition to the curvature of the second spiral path 34 that results from a spiral path that is disposed on a surface of revolution, as shown in FIG. 1, there may be an in-surface curvature of the second spiral path 34 and the extruded strip 28 of material as is shown most clearly in FIG. 8. In particular, when the second spiral path 34 is disposed on a non-cylindrical surface of revolution, such as the dome shape shown in FIG. 1, in-surface curvature of the second spiral path 34 may increase (corresponding to a decrease in the radius 128) as the second spiral path 34 approaches the central axis 30. As this increasing curvature may limit the ability for the extrusion unit 18 to close-off a structure 12 that is based on a second spiral path 34 disposed on a non-cylindrical surface of revolution, such structures may include an opening around the central axis. Such an opening may be closed, if so desired, with a suitable cap or vent element. To minimize the size of such a resulting opening and/or to enhance the ability of the extrusion head 106 to close-off a particular structure, some or all of the lower surfaces 130 of the extrusion head 106 may be curved, as shown in FIG. 8.

In some nonexclusive illustrative examples, the structure fabricating apparatus 10 may be configured such that the extrusion unit 18, and more specifically the extrusion head 106, is properly positioned notwithstanding any deformations of the support 14. Such deformation of the support 14 may include the aforementioned deviations of the carriage 16 from the first spiral path 32 or deflections of the support 14 from a plane that might otherwise contain the support 14 and the central axis 30. For example, the structure fabricating apparatus 10 may be configured to make a continuous spatial survey of the spatial positions of the extrusion unit 18 and/or the extrusion head 106 and, based on the results of such a survey, use the support apparatus 100, the drive mechanism 108 and/or the reaction forces that result from the extrusion process to maintain the extrusion unit 18 and/or the extrusion head 106 along the second spiral path 34 notwithstanding any deformations of the support 14.

The extrusion unit 18 and/or the structure fabricating apparatus 10 may include a source 132 of extrudable material 134. For example, when the extrusion unit 18 is used to extrude thermoplastic material, source 132 may be a source of pressurized heat-softened thermoplastic material. The source 132 may be located at any suitable position relative to the extrusion unit 18 and/or the structure fabricating apparatus 10. For example, as shown schematically in the nonexclusive illustrative example presented in FIG. 2, the source 132 may be disposed in the interior 42 of the structure 12, with the extrudable material 134 being supplied to the extrusion unit 18 as indicated by the arrow 136. Methods of supplying extrudable material along the path schematically indicated by arrow 136, such as screw or auger-type feeders, are well known in the art and will not be discussed in detail herein.

Figure 10:
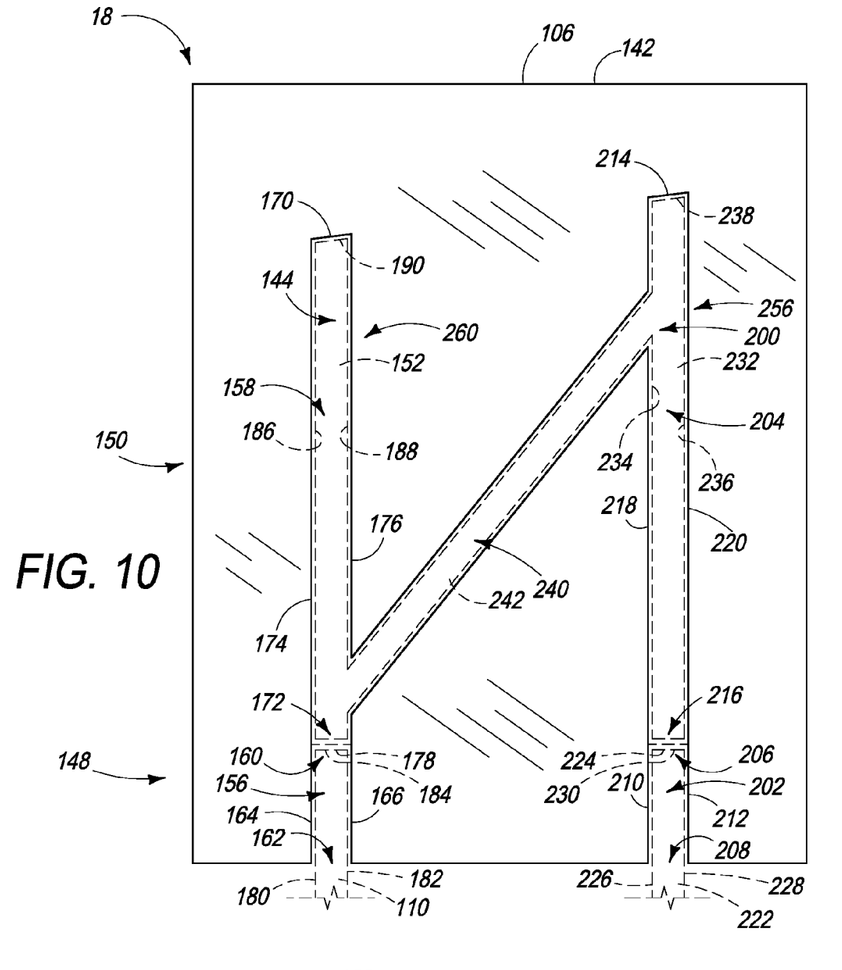
FIG. 10 is another cross-sectional view of the extrusion head of FIG. 6 showing a nonexclusive illustrative example of an extrusion die and a schematic representation of extruded strips of material, taken generally along line 10-10 in FIG. 8.
Figure 13:
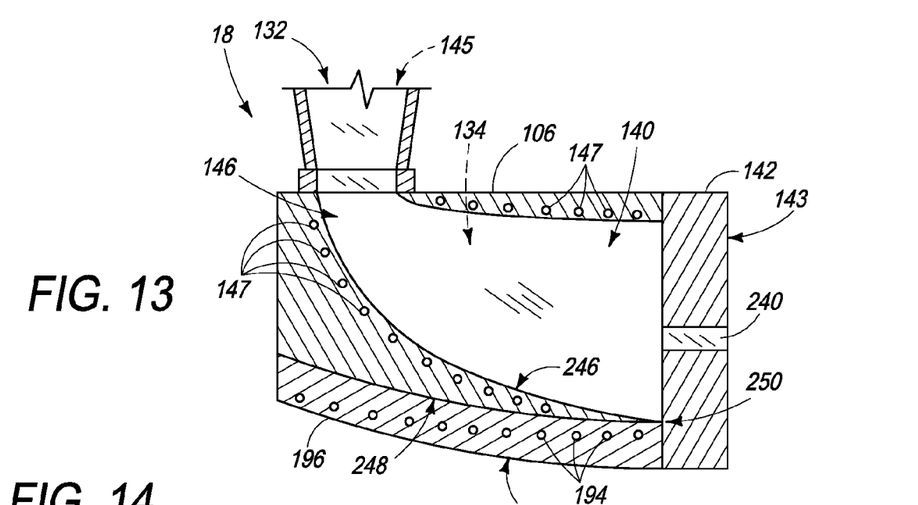
FIG. 13 is another cross-sectional view of the extrusion head of FIG. 6, taken generally along line 13-13 in FIG. 6.

As shown in FIGS. 6, 8 and 10, the extrusion head 106 may include a manifold 140 and an extrusion die 142 having a face 143 and at least a first opening 144, which may be transverse to the face 143. The ordinal numbers recited herein (first, second, third, etc.) with respect to the description of the various portions of the extrusion die 142 should not be considered limiting. Rather, the ordinal numbers recited in this disclosure are used solely for the illustrative purpose of distinguishing the various portions of extrusion die 142. Under an impetus provided by a suitable feed mechanism 145, the extrudable material 134, such as in the form of a pressurized heat-softened thermoplastic material, may enter the extrusion head 106 through an inlet 146, pass through the manifold 140, and be extruded through at least a portion of the first opening 144. In some nonexclusive illustrative examples, the extrusion head 106 may include at least one heating element 147, which may be disposed in a suitable location, such as proximate the inlet 146 or, as shown in FIG. 13, proximate the manifold 142. When present, the heating elements 147 may at least partially assist with softening, heating and/or melting the extrudable material 134 prior to extrusion.

The general details and background of suitable feed mechanisms 145 and the process by which the extrudable material 134 may be supplied to the extrusion die 142, including the production and/or creation of pressurized heat-softened thermoplastic material, are well known in the art and will not be discussed in detail herein. By way of nonlimiting example, a suitable feed mechanism 145 for the supply of pressurized heat-softened thermoplastic material for extrusion may be one that is generally similar to a screw-based extruder, such as the one described in U.S. Pat. No. 3,619,329, the complete disclosure of which has been incorporated by reference in its entirety for all purposes.

As shown in FIG. 10, the extrusion die 142 may include a first or guide portion 148 and a second or extrusion portion 150 that is proximate the guide portion 148. The guide portion 148 may pass along the first or preexisting strip 110 of material, which may have been previously extruded through the extrusion portion as will be more fully discussed below, as the extrusion unit 18 moves along the second spiral path 34, as shown in FIG. 8. The strip 28 of material, which may be a heat-softenable thermoplastic as discussed above, may be extruded through the extrusion portion 150 in the form of a second or currently extruded strip 152 of material that is extruded along the second spiral path 34. As will be more fully discussed below, the currently extruded strip 152 of material may be fused onto the first or preexisting strip 110 of material as the currently extruded and preexisting strips of material pass along and/or through the extrusion die 142.

The portions and openings in the extrusion die 142, along with their corresponding functions, will now be discussed with reference to the nonexclusive illustrative example illustrated in FIGS. 6 and 10. The first opening 144 may include a guide or first portion 156 and an extrusion or second portion 158. The first portion 156 of the first opening 144, which may be within the first or guide portion 148 of the extrusion die 142, may include a first open proximal end 160, a first open distal end 162, and first and second opposed sidewalls 164, 166, which may extend from the first open proximal end 160 toward the first open distal end 162. The second portion 158 of the first opening 144, which may be within the second or extrusion portion 150 of the extrusion die 142, may include a first proximal end wall 170, a second open distal end 172, and third and fourth opposed sidewalls 174, 176, which may extend from the first proximal end wall 170 toward the second open distal end 172. As shown in FIG. 10, the first open proximal end 160 may correspond to the second open distal end 172.

The first strip 110 of material may include a first fusion surface 178 and first and second side surfaces 180, 182, which may extend from the first fusion surface 178. As shown in FIGS. 6 and 10, the first strip 110 of material may at least partially pass through the guide or first portion 156 of the first opening 144 as the extrusion head 106 is advanced along the first strip 110 of material with the first and second side surfaces 180, 182 proximate at least a portion of respective ones of the first and second opposed sidewalls 164, 166 and the first fusion surface 178 proximate the first open proximal end 160 of the first portion 156 of the first opening 144. The first fusion surface 178 may provide a first distal end wall 184 for the second portion 158 of the first opening 144.

For the purpose of clarity, the various strips of material have been illustrated in FIG. 10 to be of a smaller size as compared to the various corresponding portions of the various openings. The representations of the various strips of material in FIG. 10 are schematic in nature. Thus, it is within the scope of the present disclosure for the various strips of material, whether before, during or after extrusion and/or passage through and/or along the extrusion die, to have a cross-sectional shape and/or size that is smaller, larger, or approximately the same cross-sectional shape and/or size as the cross-sectional shape and/or size of the various corresponding portions of the various openings.

The feed mechanism 145 may extrude the extrudable material 134 through the second portion 158 of the first opening 144 such that a second strip 152 of material is extruded through the second portion 158 as the extrusion head 106 is advanced along the first strip 110 of material. As the extrudable material 134 is extruded through the second portion 158, the third and fourth opposed sidewalls 174, 176 may form third and fourth side surfaces 186, 188 on the second strip of material 152, and the first proximal end wall 170 may form a first exposed surface 190 on the second strip of material 152. In some nonexclusive illustrative examples, such as where the extrusion head 106 moves along a second spiral path 34, the first and second strips of material 110, 158 may form portions of a continuous spiral strip of material that is extruded through the extrusion die 142 and along the second spiral path 34. In such an example, the first exposed surface 190 may provide a fusion surface on the second strip 152 of material when the guide or first portion 156 of the first opening 144 of the extrusion head 106 is advanced along the second strip 152 of material.

The second strip 152 of material may be fused to the first fusion surface 178 on the first strip 110 of material as the extrudable material 134 is extruded through the second portion 158. For example, when the extrudable material 134 is a heat-softened thermoplastic material, a melt or fusion bond may be formed between the extrudable material 134 that is passed through the second portion 158 proximate the first distal end wall 184 of the second portion 158 of the first opening 144 that is provided by the first fusion surface 178.

In order to assist with and/or enhance fusion of the second strip 152 of material to the first strip 110 of material, some nonexclusive illustrative examples of the extrusion head 106 may include at least one heating element 194. As shown in FIG. 13, the heating element 194 may be disposed in a guide portion 196 of the extrusion head 106. As shown in FIGS. 8, 9 and 11-13, the guide portion 196 of the extrusion head 106 may align with the guide portion 148 of the extrusion die 142. The heating elements 194 may be configured to optionally at least partially heat and/or reheat a portion of the first strip 110 of material, such as the first fusion surface 178. Heating and/or reheating at least the first fusion surface 178 prior to the first strip 110 of material at least partially passing through the first portion 156 of the first opening 144 may at least partially facilitate fusion between the second strip 152 of material and the first strip 110 of material.

As shown in FIG. 10, the extrusion die 142 may, in some nonexclusive illustrative examples, include a second opening 200. The second opening 200 may include a guide or third portion 202 and an extrusion or fourth portion 204. The third portion 202 of the second opening 200, which may be within the first or guide portion 148 of the extrusion die 142, may include a second open proximal end 206, a third open distal end 208, and fifth and sixth opposed sidewalls 210, 212, which may extend from the second open proximal end 206 toward the third open distal end 208. The fourth portion 204 of the second opening 200, which may be within the second or extrusion portion 150 of the extrusion die 142, may include a second proximal end wall 214, a fourth open distal end 216, and seventh and eighth opposed sidewalls 218, 220, which may extend from the second proximal end wall 214 toward the fourth open distal end 216. As shown in FIG. 10, the second open proximal end 206 may correspond to the fourth open distal end 216.

As shown in FIG. 6, the drive mechanism 108 may additionally or alternatively be configured to advance the extrusion head 106 along a third or preexisting strip 222 of material. The third strip 222 of material may include a second fusion surface 224 and fifth and sixth side surfaces 226, 228, which may extend from the second fusion surface 224. As shown in FIGS. 6 and 10, the third strip 222 of material may at least partially pass through the third portion 202 of the second opening 200 as the extrusion head 106 is advanced along the third strip 222 of material with the fifth and sixth side surfaces 226, 228 proximate at least a portion of respective ones of the fifth and sixth opposed sidewalls 210, 212 and the second fusion surface 224 proximate the second open proximal end 206 of the third portion 202. The second fusion surface 224 may provide a second distal end wall 230 for the fourth portion 204 of the second opening 200.

The feed mechanism 145 may extrude the extrudable material 134 through the fourth portion 204 of the second opening 200 such that a fourth strip 232 of material is extruded through the fourth portion 204 as the extrusion head 106 is advanced along the third strip of material 222. As the extrudable material 134 is extruded through the fourth portion 204, the seventh and eighth opposed sidewalls 218, 220 may form seventh and eighth side surfaces 234, 236 on the fourth strip of material 232, and the second proximal end wall 214 may form a second exposed surface 238 on the fourth strip of material 232. In some nonexclusive illustrative examples, such as the one discussed above with respect to the first and second strips 110, 158 of material, the third and fourth strips 222, 232 of material may form portions of a continuous spiral strip of material that is extruded through the extrusion die 142 and along the second spiral path 34, in which the second exposed surface 238 may provide a fusion surface on the fourth strip 232 of material. Further, similarly to the fusion of the second strip 152 of material to the first fusion surface 178 on the first strip 110 discussed above, the fourth strip 232 of material may be fused to the second fusion surface 224 on the third strip of material 222.

Although the above discussion makes reference to the extrusion of second and fourth strips 152, 232 of material that may be extruded through a second portion 158 of a first opening 144 and a fourth portion 204 of a second opening 200, it should be understood that the second and fourth strips 152, 232 may be portions of a single strip of material. For example, the extrusion die 142 may further include a third opening 240, which may interconnect the first and second openings 144, 200. The third opening 240 may extend from the fourth sidewall 176 of the first opening 144 to the seventh sidewall 218 of the second opening 200. In such an example, the feed mechanism 145 may be configured to extrude the extrudable material 134 through the third opening 240 such that a fifth strip 242 of material is extruded through the third opening 240 as the extrusion head 106 is advanced along the first and/or third strips 110, 222 of material. The fifth strip 242 of material may extend from the fourth side surface 188 of the second strip 152 of material to the seventh side 234 surface of the fourth strip 232 of material.

Figure 11:
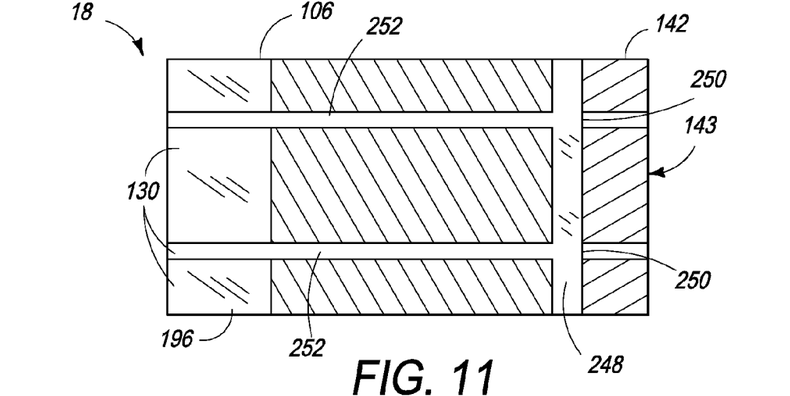
FIG. 11 is another cross-sectional view of the extrusion head of FIG. 6, taken generally along line 11-11 in FIG. 8.
Figure 12:
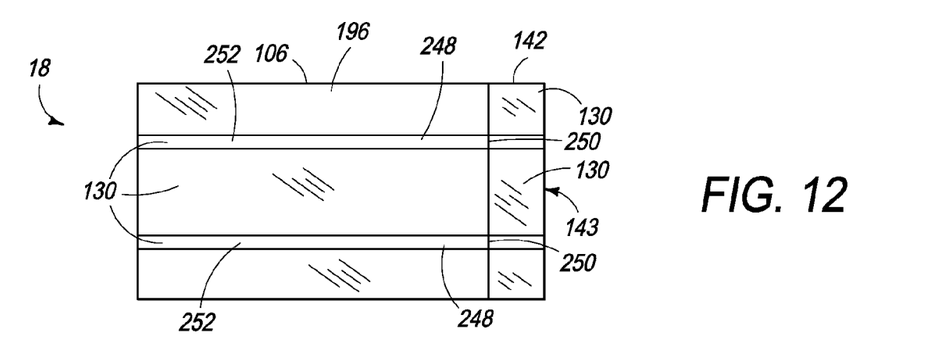
FIG. 12 is a view of the extrusion head of FIG. 6, taken generally along line 12-12 in FIG. 8.

The extrusion head 106 may be configured such that the manifold 140 smoothly merges with the guide portion 196. A smooth merge between the manifold 140 and the guide portion 196 may at least partially assist with bringing the extrudable material 134, which is passing through the manifold 140, into contact with the fusion surfaces of the first and/or third strips 110, 222, which are passing through the guide portion 196 of the extrusion head 106 and the guide portion 148 of the extrusion die 142. For example, as shown in FIGS. 9, 11 and 13, a lower surface 246 of the manifold 140 may merge with an upper surface 248 of the guide portion 196 at an edge 250, which may be relatively sharp. The upper surface 248 may correspond to an upper surface of one of the slots 252 in the guide portion 196 that may correspond to the first portion 156 of the first opening 142 and/or the third portion 202 of the second opening 200.

Figure 14:
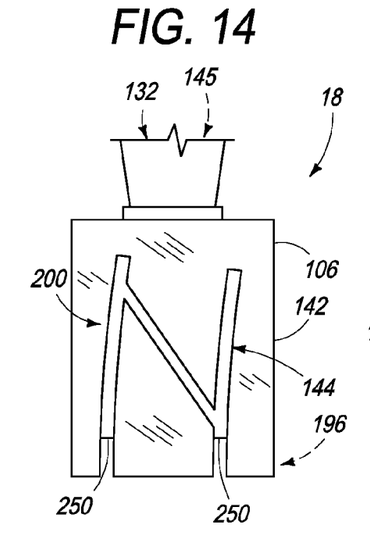
FIG. 14 is a front view of another nonexclusive illustrative example of an extrusion die suitable for use with the extrusion unit such as the extrusion unit of FIG. 6.

In some nonexclusive illustrative examples, the openings in the extrusion die 142, such as the first and second openings 144, 200, may lack lateral symmetry. Such a lack of lateral symmetry of the openings may be useful when fabricating structures 12 that do not have vertical walls, such as the dome-shaped structures illustrated in FIGS. 1, 2 and 4. For example, as shown in FIG. 6, the particular opening 256 in the extrusion die 142 that corresponds to the exterior surface 258 of the structure 12 may be relatively taller than the particular opening 260 in the extrusion die 142 that corresponds to the interior surface 262 of the structure 12. In such an example, the resulting extruded strip of material would have upper and lower surfaces that are not parallel, as suggested by the indicated lines 264 in FIG. 6. Additionally or alternatively, as shown in FIG. 14, the openings in the extrusion die 142, such as the first and second openings 144, 200, may include a vertical curvature. The degree of vertical curvature may be selected such that the exterior and/or interior surfaces 258, 262 may be smoothly curved, rather than having a faceted appearance as shown in FIG. 4.

Figure 15:
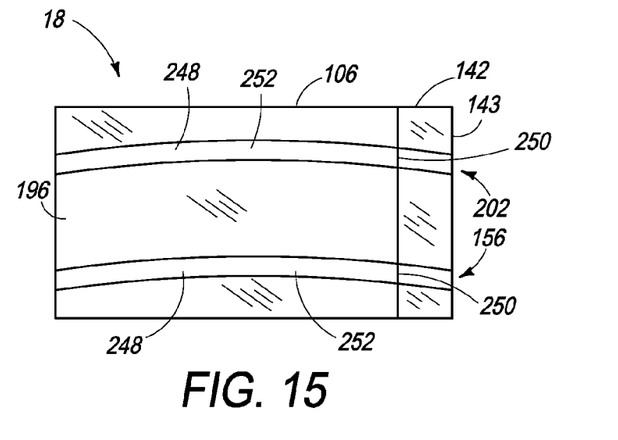
FIG. 15 is a bottom view of another nonexclusive illustrative example of extrusion die in use with another nonexclusive illustrative example of an extrusion unit.
Figure 16:
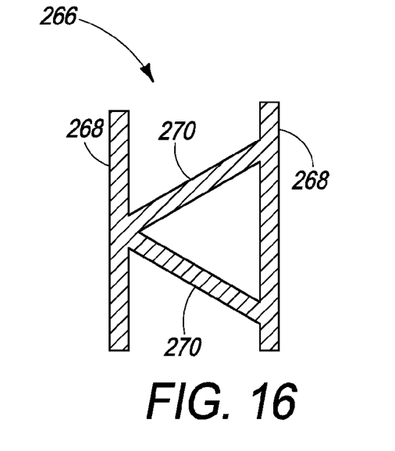
FIGS. 16-20 show additional nonexclusive illustrative examples of suitable extrusion profiles.
Figure 17:
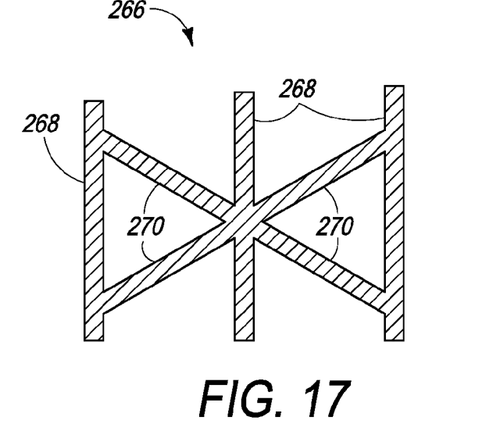
Figure 18:
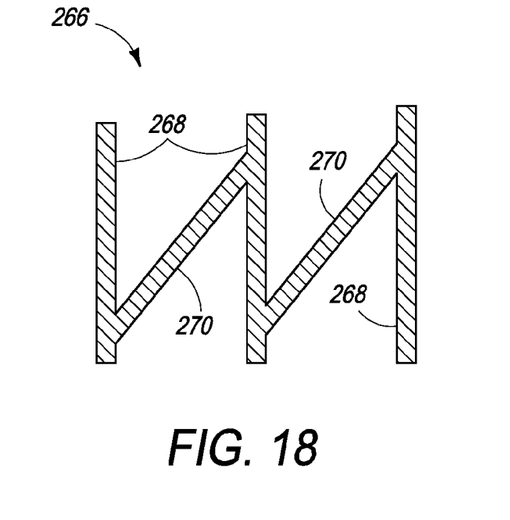
Figure 19:
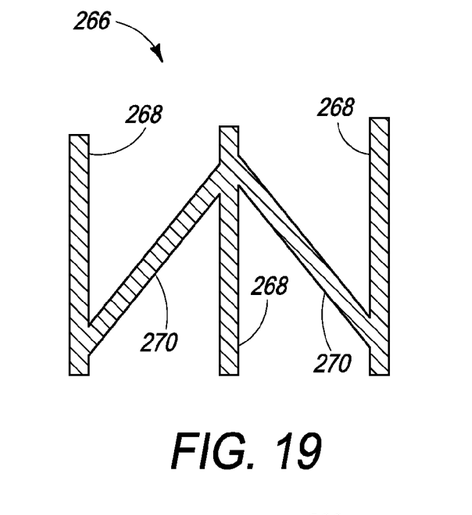
Figure 20:
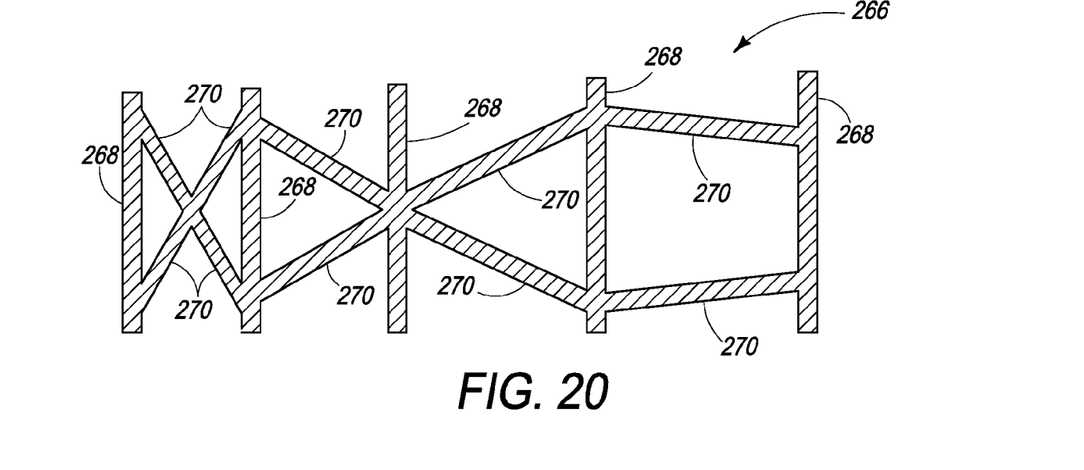

In some nonexclusive illustrative examples, portions of the extrusion head 106 may include a lateral curvature as shown in FIG. 15. Such lateral curvature may be useful when fabricating a structure 12 that is a surface of revolution having a radius that is relatively small relative to the radial width of the strip 28 of material. Nonexclusive illustrative examples of portions of the extrusion head 106 that may be laterally curved may include the guide portion 196, slots 252, the first opening 144, and/or the second opening 200.

Nonexclusive illustrative examples of suitable profiles for the strips of material extruded through the extrusion die 142 are illustrated in FIGS. 6 and 16-20 and indicated generally at 266. Suitable numbers, combinations and dimensions of vertical 268 and lateral 270 wall components may be selected based on factors such as the size and expected loading for the structure and the particular extruded material. For example, as shown in FIGS. 6 and 16-20, the strips of material may include two, three, four, or even five or more vertical wall components 268. As used herein, the directions or axes corresponding to "vertical" and "lateral" are based on the local orientation of the extrusion head 106 during extrusion, as shown in FIG. 6. In particular, as used herein, the terms "vertical" an "lateral" should not be understood to require any particular orientation in space, such as relative to the earth or the base surface 46. In some situation, a particular profile may be chosen to provide a particular repeating pattern of the lateral wall components in the structure 12, such as the repeating pattern shown in FIG. 4.

A nonexclusive illustrative example of a method of building a structure, such as the structure 12, may include providing a source of pressurized heat-softened thermoplastic material, providing an extrusion head, extruding a first strip of thermoplastic material through the extrusion head, passing at least a portion of the first strip of material through the extrusion head, extruding a second strip of thermoplastic material through the extrusion head, and fusing the second strip of thermoplastic material to the first strip of thermoplastic material.

The extrusion head may include an extrusion die having an opening including first and second portions. The second portion of the opening may include a proximal end wall and first and second opposed sidewalls. The first strip of thermoplastic material may be extruded through the second portion of the opening. The proximal end wall may be configured to form a first fusion surface on the first strip of material. The first and second opposed sidewalls may be configured to form first and second side surfaces on the first strip of material.

When at least a portion of the first strip of material is passed through the extrusion head, at least a portion of the first strip of material may be passed through the first portion of the opening such that the first fusion surface of the first strip of material provides a first distal end wall for the second portion of the opening. The second strip of thermoplastic material may be extruded through the second portion of the opening. The first and second opposed sidewalls may form third and fourth side surfaces on the second strip of material. The second strip of material may fused to the first fusion surface on the first strip of material. The proximal end wall may form an exposed surface on the second strip of material.

Some nonexclusive illustrative examples of the method of building a structure may include moving the extrusion head in a spiral path such that the first and second strips of thermoplastic material may be third and fourth portions of a spiral strip of thermoplastic material extruded through the second portion of the opening as the extrusion head moves in the spiral path. The exposed surface may provide a second fusion surface on the second strip of thermoplastic material. The first and second fusion surfaces may provide fifth and six portions of a continuous spiral fusion surface.

Some nonexclusive illustrative examples of the method of building a structure may include providing a start ramp. The start ramp may include a third fusion surface, which may be disposed along the spiral path. At least a portion of the start ramp may be passed through the first portion of the opening such that the third fusion surface may provide a second distal end wall for the second portion of the opening. Extruding the first strip of thermoplastic material through the second portion of the opening may include fusing the first strip of material to the third fusion surface.

Some nonexclusive illustrative examples of the method of building a structure may include heating at least the first fusion surface of the first strip of material prior to passing the at least a portion of the first strip of material through the first portion of the opening.

Some nonexclusive illustrative examples of the method of building a structure may include removing the extrusion head from the first and/or second strips of thermoplastic material after fusing the second strip of thermoplastic material to the first strip of thermoplastic material.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

I claim:

1. A thermoplastic extrusion unit for extruding a strip of thermoplastic material onto a preexisting strip of material, the preexisting strip having an upper surface and two opposed side surfaces, the upper and side surfaces defining a profile, the extrusion unit comprising:
   a source of pressurized heat-softened thermoplastic material;
   an extrusion head comprising a guide slot and an extrusion die, the guide slot having an edge adjacent the extrusion die, the extrusion die including a first opening having a guide portion and an extrusion portion, wherein:
   the guide portion of the first opening comprises a first open distal end and first and second opposed sidewalls extending from the edge down to the first open distal end,
   the extrusion portion of the first opening comprises a first proximal end wall and third and fourth opposed sidewalls extending from the first proximal end wall down to the edge, wherein
   the guide slot, the edge, and the guide portion of the opening are shaped and aligned to receive the profile of the preexisting strip;
   a drive mechanism including an engagement mechanism configured to engage the preexisting strip and to advance the extrusion head along the preexisting strip of material, wherein:
   the preexisting strip of material is received in the guide slot and the guide portion of the first opening as the extrusion head is advanced along the preexisting strip of material with the edge of the extrusion head resting on the upper surface of the preexisting strip of material, and
   the upper surface of the preexisting strip of material provides a first distal end wall for the extrusion portion of the first opening; and
   a feed mechanism to deliver the pressurized heat-softened thermoplastic material to the second portion, wherein the extrusion portion extrudes the strip of thermoplastic material as the extrusion head is advanced along the preexisting strip of material, wherein:
   the strip of thermoplastic material is fused to the upper surface on the preexisting strip of material.

2. The thermoplastic extrusion unit of claim 1, further comprising a connection link that connects the extrusion head to the drive mechanism and is configured to selectively maintain the drive mechanism in at least one position relative to the extrusion head.

3. The thermoplastic extrusion unit of claim 2, wherein the extrusion die includes a face transverse to the first opening, and the connection link is configured to selectively maintain the drive mechanism in at least one angular orientation relative to the face.

4. The thermoplastic extrusion unit of claim 1, wherein the extrusion head is configured to reheat at least the upper surface of the preexisting strip of material prior to the preexisting strip of material being received in the guide portion of the first opening.

5. The thermoplastic extrusion unit of claim 1, wherein the preexisting strip of material was previously extruded through the extrusion portion of the first opening.

6. The thermoplastic extrusion unit of claim 1 incorporated into a structure fabricating apparatus, the structure fabricating apparatus comprising:
   a support having a distal portion and a proximal portion, wherein the support is configured for rotation about a central axis, the distal portion of the support is spaced from the central axis, and the proximal portion of the support is disposed proximate the central axis; and
   a carriage disposed on the support, wherein the carriage is configured for motion along the support between the distal portion and the proximal portion, the carriage is configured to move along a first spiral path about the central axis when the support rotates about the central axis, the thermoplastic extrusion unit is supported by the carriage and advanced along at least a portion of a second spiral path as the drive mechanism advances the extrusion head along the preexisting strip of material, and the strip of thermoplastic material is extruded along the second spiral path.

7. The structure fabricating apparatus of claim 6, wherein the preexisting strip of material is a start ramp not formed by the extrusion unit.

8. The thermoplastic extrusion unit of claim 1 for extruding a second strip of thermoplastic material onto a second preexisting strip of material defining a profile, wherein:
   the extrusion die further comprises a second opening having second guide and extrusion portions, wherein the second guide portion is shaped and aligned to receive the profile of the second preexisting strip of material;
   and further wherein the feed mechanism also delivers the pressurized heat-softened thermoplastic material through the second extrusion portion to be fused to the second preexisting strip of material.

9. The thermoplastic extrusion unit of claim 8, wherein the extrusion die further comprises a third opening interconnecting the first opening and the second opening, and further wherein the feed mechanism delivers the pressurized heat-softened thermoplastic material through the third opening.

10. The thermoplastic extrusion unit of claim 1 wherein the engagement mechanism of the drive mechanism includes a wheel, and wherein the wheel is configured to engage one of the opposed side surfaces of the preexisting strip.

11. The thermoplastic extrusion unit of claim 10 wherein the engagement mechanism of the drive mechanism includes a second wheel, and wherein the wheel is configured to engage the other one of the opposed side surfaces of the preexisting strip.

12. The thermoplastic extrusion unit of claim 10 wherein the drive mechanism is configured to turn the wheel to advance the extrusion head along the preexisting strip.

* * * * *